July 3, 1928.
B. BORLAND
SEAL
Filed Dec. 21, 1925
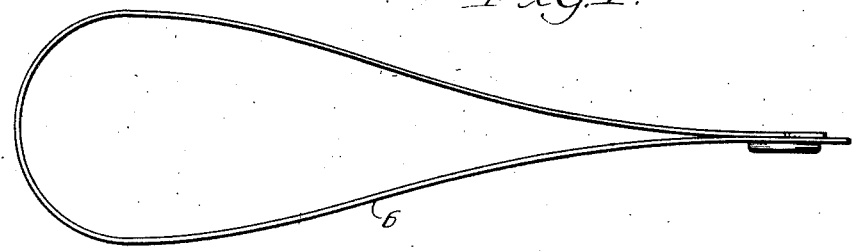
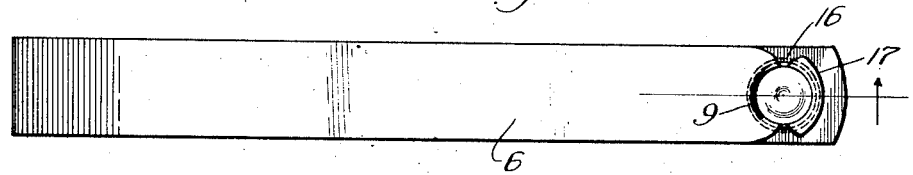
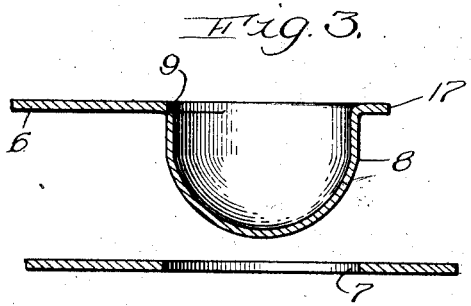
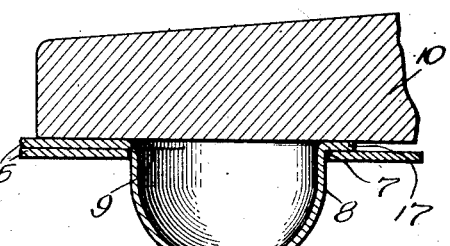
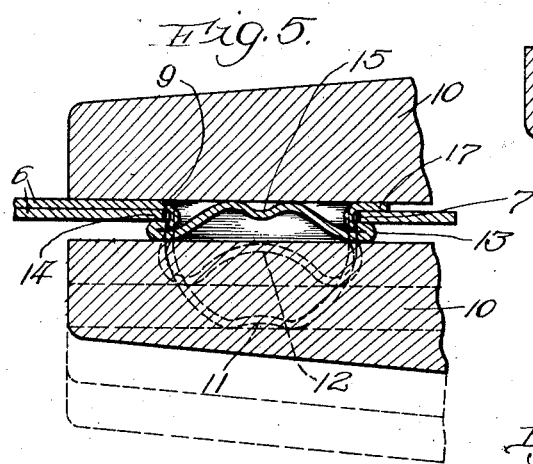
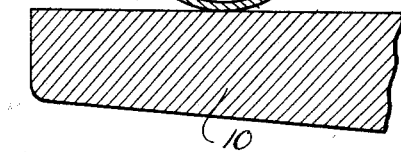
Inventor,
Bruce Borland
By Glenn S. Noble
Atty.

Patented July 3, 1928.

1,675,327

UNITED STATES PATENT OFFICE.

BRUCE BORLAND, OF CHICAGO, ILLINOIS.

SEAL.

Application filed December 21, 1925. Serial No. 76,699.

This invention relates to seals such as are commonly known as car seals and which are used for sealing freight cars, sealing different parts of machinery or wherever devices of this character may be utilized.

These seals are used in large quantities, and as they are always destroyed when used, it is desirable to make them of as simple construction and as cheaply as possible. It is also desirable to make a seal of this character so that, after it has been broken, it will readily show that it has been broken, or in other words, to make the parts so that they cannot be conveniently or easily fastened together to give the appearance of a whole or complete seal.

I accomplished these advantages in my improved device, and among its further objects are to provide an improved seal which may be made of cheap material, such as tin or light steel; to provide a seal which may be readily sealed or fastened by a seal press, having flat engaging jaws; to provide a seal having one or more weakened portions adjacent to the fastening button or teat so that the strip or seal will be broken at a predetermined place when it is pulled apart in the usual manner; and to provide a seal having such further advantages and novel features as will appear more fully from the following description. In the accompanying drawings illustrating this invention:

Figure 1 is a side view of a seal, showing the ends fastened together;

Figure 2 is a plan view of the same, these figures being about twice the size of a common form of car seal which is made from a strip three-eighths of an inch in width;

Figure 3 is a sectional view showing the end portions of the seal on a still further enlarged scale;

Figure 4 is a sectional view showing the ends in position for sealing and engaged by the jaws of the sealing press; and Figure 5 is a similar view showing the parts in closed or fastening position.

It has heretofore been proposed to make car seals of strips of metal with a riveting projection drawn up or formed from the body of the strip, but in so far as I am aware none of such early seals proved successful or were made commercially, this probably being due to the difficulty or impossibility of forming the projections in the manner shown in the early patents relating to such devices. I have overcome such difficulties in the present device by the proper proportioning of the parts and the incorporation of such features as will be apparent from the description.

In order to fully disclose the invention, it may be most readily understood from a description of a preferred size of car seal, such as are most commonly used. For instance, the seal is made from a strip 6 of tin or suitable sheet metal such as sheet steel, approximately three-eighths of an inch in width and of any desired length. An eye or hole 7 is punched in the strip and is approximately one-fourth of an inch in diameter. A fastening button or projection 8 is drawn or punched from the body of the strip and is adapted to engage with the hole 7 and be riveted or headed over the adjacent portion of the strip to fasten the ends together. In the particular size referred to, this button or projection is approximately one-fourth of an inch in diameter and projects outwardly about five thirty-seconds of an inch above the adjacent surface of the strip. This button or projection is approximately cylindrical for a short distance, as shown at $x$, and the outer or closed portion is substantially hemispherical having a radius slightly larger than the cylindrical portion. When this button or projection is formed the side walls are preferably thinned or weakened a sufficient amount so as to permit the bending or folding action necessary in the riveting process which will presently be described.

In order that the strip will be broken in a predetermined and favorable place, when the seal is broken, the strip is weakened by punching or cutting as shown at 9. This cut or notch preferably extends about one quarter of the way around the button on the side toward the loop, as will be readily seen from Figures 2 and 3. In the actual construction, this cut or weakening of the material, which is done by a suitable punch, is very slight and scarcely visible to the naked eye, and would not ordinarily be taken into consideration by anyone wanting to tamper with one of the seals.

By proportioning the button or projection in the manner specified, it may be easily riveted by a suitable sealing press having jaws with flat faces, as shown at 10 in Figures 4 and 5. On account of being able to use a press of this type, it is very readily applied to the seals and more convenient in operation than where a special die or form is necessary to perform the riveting action.

When pressure is brought on the jaws against the projection or rivet 8, the outer portion of the rivet will first be turned in, as indicated at 11 by the dotted lines in Figure 5. This inward curling or bending of the metal in a concave form will continue until a large portion of the hemispherical part of the rivet is depressed, as indicated by the dotted lines at 12 in Figure 5, and until the outward pressure begins to become sufficient to expand the rivet, so that the outer portion becomes larger than the hole 7. This outward pressure continues until a head 13 is formed, which projects over the adjacent surface 14 of the strip, so as to rivet the parts together. The further movement of the jaws continues to flatten out the parts until the inwardly extending curved portion 12 engages with the opposite jaw, which causes the central portion to again be bent inwardly, as shown at 15.

The button or projection 8 is preferably made adjacent to the end of the strip, and as it is being formed, the sides are drawn in until notches or recesses are produced, as indicated at 16 in Figure 2, and there is very little of the stock 17 left beyond the button or projection. When the parts have been formed and riveted or fastened together as described, the head 13 will extend but a short distance over the adjacent surface so that it is practically impossible to apply a tool under the same in order to raise it up to disengage the end. When the seal is to be broken, it is customary to draw the sides of the loop apart, and this will cause the strip to break around the notch or weakened portion 9, and as this notch is practically at the base of the rivet, there will be no material projecting so that the end could again be caught under the same to make the seal appear as though it were not broken. This arrangement, whereby when the seal has once been broken it is difficult, if not impossible, to make it appear as though it had not been tampered with, comprises one of the particularly desirable features of this invention.

While I have selected a standard or well-known size for convenience in description, it will of course be apparent that my improved seals may be made in any size desired and changes may be made in details of construction in order to adapt the seals for different uses, and therefore I do not wish to be limited to the exact arrangement herein shown and described, except as specified in the following claim, in which I claim:

A seal comprising a strip of metal having an integrally formed button adjacent to one end, and a hole adjacent to the other end and having a notch at the base of the stud on the side of the stud toward the hole.

BRUCE BORLAND.